(12) United States Patent
Sakamoto

(10) Patent No.: US 7,243,546 B2
(45) Date of Patent: Jul. 17, 2007

(54) ACCELERATION SENSOR CHIP

(75) Inventor: Akihiro Sakamoto, Miyazaki (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 11/362,176

(22) Filed: Feb. 27, 2006

(65) Prior Publication Data

US 2006/0196268 A1    Sep. 7, 2006

(30) Foreign Application Priority Data

Mar. 2, 2005 (JP) .............................. 2005-057312

(51) Int. Cl.
*G01P 15/09* (2006.01)
*G01P 15/00* (2006.01)

(52) U.S. Cl. ............................ 73/514.34; 73/514.29; 73/514.38

(58) Field of Classification Search ............ 73/514.34, 73/514.33, 514.29, 514.36, 514.38, 514.16
See application file for complete search history.

(56) References Cited

U.S. PATENT DOCUMENTS 6,772,632 B2 * 8/2004 Okada .................... 73/514.38
6,931,928 B2 * 8/2005 Hashimoto et al. ...... 73/514.33
7,010,976 B2 * 3/2006 Ozawa et al. ............ 73/504.12
7,019,231 B2 * 3/2006 Ishikawa et al. ....... 200/61.45 R
2004/0261529 A1 * 12/2004 Yoshida et al. .......... 73/514.33

FOREIGN PATENT DOCUMENTS

| JP | 2002-296293 | * 10/2002 |
| JP | 2004-109114 | * 4/2004 |
| JP | 2004-198243 | 7/2004 |

* cited by examiner

*Primary Examiner*—Helen Kwok
(74) *Attorney, Agent, or Firm*—Rabin & Berdo, PC

(57) ABSTRACT

An acceleration sensor chip has a frame portion having a frame body portion and protruding portions. The acceleration sensor chip also includes a mobile structure having a central weight portion supported movably by four beam portions. The mobile structure also has four rectangular parallelepiped-form protruding weight portions The acceleration sensor chip also includes a plurality of stoppers extending above the protruding weight portions.

13 Claims, 9 Drawing Sheets

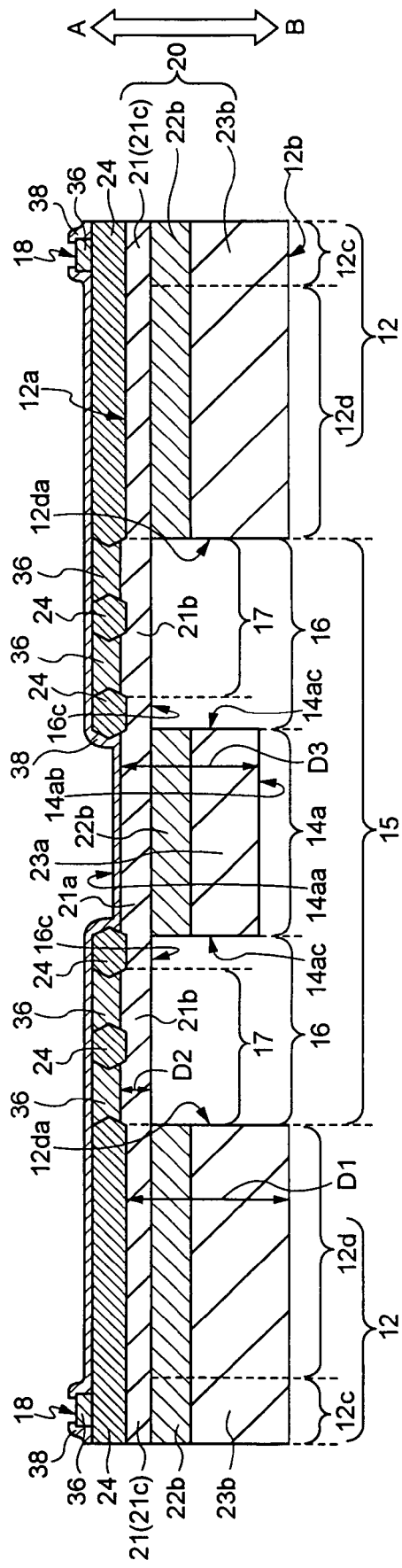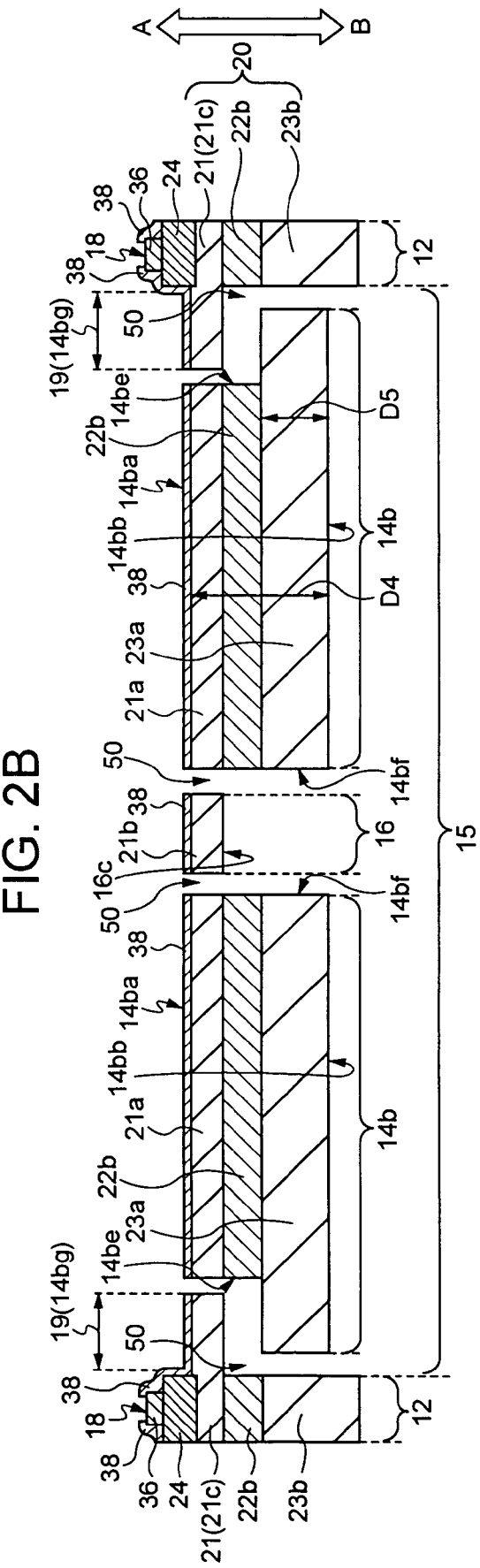

ACCELERATION SENSOR CHIP

BACKGROUND OF THE INVENTION

1. Field of the Invention

This invention relates to an acceleration sensor chip having improved sensitivity.

2. Description of the Related Art

Techniques are under development for manufacturing minute mobile structures of approximately several hundred μm using micromachining technology such as semiconductor microprocessing techniques. For example, these techniques are applied to various sensors, optical communication switches, radiofrequency (RF) components, and so on.

The mobile structure can be manufactured using a conventional semiconductor manufacturing process, and can be integrated onto a single chip.

A chip on which a system having a specific function, including the above described mobile structure, is constructed is known as a Micro Electrical Mechanical System (MEMS) or a Micro-System-Technology device (MIST devices). These systems and devices are referred to simply as MEMS devices hereafter.

An acceleration sensor (see Japanese Patent Application Kokai (Laid-Open) No. 2004-198243, for example) is known as the MEMS device.

Referring to FIGS. 9A to 9C of the accompanying drawings, an outline of the constitution of the conventional acceleration sensor disclosed in Japanese Patent Application Kokai No. 2004-198243 will be described.

FIG. 9A is a schematic plan view illustrating the upper face of constitutional elements of a conventional acceleration sensor chip package. FIG. 9B is a schematic cross-sectional view of the acceleration sensor chip package, taken along the dot-dash line 9B—9B in FIG. 9A. FIG. 9C is a schematic diagram showing another cross-sectional view of the acceleration sensor chip package, taken along the dot-dash line 9C—9C in FIG. 9A.

A piezo-type acceleration sensor 110 disclosed in Japanese Patent Application Kokai No. 2004-198243 includes a peripheral portion 112 which supports a weight fixing portion 114a flexibly, and four weight portions 114b which are fixed to the weight fixing portion 114a. The weight fixing portion 114a is connected to the peripheral portion 112 by four beam portions 116. The beam portions 116 are provided with piezo elements 136 for detecting displacement of the weight portion 114b.

The outer shape of the upper surface of the piezo-type acceleration sensor 110 and the shape of the upper surface of an opening portion 150 receiving the weight fixing portion 114a and weight portions 114b are square.

A triangular stopper 119 is provided above a certain part of each weight portion 114b to restrict displacement of that weight portion 114b.

The groove 150, peripheral portion 112 and weight portions 114b are square, and the entire acceleration sensor chip is square when seen from its upper surface side.

An acceleration sensor chip is sometimes packaged with other chips such as a control chip for controlling operations of the acceleration sensor chip. In recent years, there is a demand for reductions in the size and thickness of the devices in which acceleration sensor chip packages are provided. Thus, there is a demand for further reductions in the size and thickness of the acceleration sensor chip packages.

When attempts are made to achieve further reductions in the size and thickness of the acceleration sensor chip, the volume of the weight portion, i.e., the mass of the weight portion, must inevitably be reduced. This results in a decrease in the detection sensitivity with respect to acceleration, vibration, tilting, and so on.

SUMMARY OF THE INVENTION

In order to respond to the demand for reduced package thickness, the acceleration sensor chip and other chips are arranged and packaged on a single plane (plate). However, it is difficult to arrange these chips and other parts in a sufficiently dense manner because the acceleration sensor chip is square.

Hence there is a demand for a technique for realizing an acceleration sensor chip enabling a simplified package layout and further reductions in size and thickness while ensuring satisfactory detection sensitivity.

An acceleration sensor chip of this invention is constituted principally as described below.

The acceleration sensor chip has a frame portion. The frame portion has a rectangular upper surface and a lower surface. The upper surface is parallel to the lower surface.

The frame portion has a frame body portion and two protruding portions. The frame body portion is a rectangular frame-form body which defines the outer shape of the chip. The protruding portions extend respectively from the center of each short side of the frame-form body toward the opposite short side.

The acceleration sensor chip further includes four beam portions. Two of the beam portions extend perpendicularly from the center of the two long sides of the frame-form body toward the opposite long side, and other two extend from the ends of the protruding portions in the same direction as the protruding portions, respectively.

The acceleration sensor chip further includes a mobile structure. The mobile structure is supported movably by the beam portions. The mobile structure includes a rectangular parallelepiped-form central weight portion and four protruding weight portions. The central weight portion includes a square first surface (upper surface), a second surface (lower surface) having the same shape as the first surface and extending in parallel to the first surface, and four side faces sandwiched between the first surface and second surface. The four side faces of the central weight portion are connected individually to the ends of the four beam portions. The protruding weight portions are connected respectively to four corner portions formed by the adjacent side faces of the central weight portion. The short sides of the protruding weight portions extend in parallel to the short sides of the frame-form body, and the long sides of the protruding weight portions extend in parallel to the long sides of the frame-form body. The protruding weight portions are spaced from the frame-form body, protruding portions, and beam portions.

The acceleration sensor chip preferably further includes a plurality of thin plate-form stoppers. The stoppers are provided in an eave form and protrude from the frame body portion over the protruding weight portions. The stoppers serve as functional portions for restricting excessive displacement of the mobile structure.

According to the acceleration sensor chip of this invention, the outer form of the acceleration sensor chip and the form of the protruding weight portions are rectangular when seen from the upper surface side, and hence the mass of the protruding weight portions can be increased without increasing the thickness of the chip. As a result, a further reduction in the thickness of the acceleration sensor chip can be achieved while improving the detection sensitivity of the acceleration sensor chip.

Further, since the outer form of the chip is made rectangular, the chip can be packaged in combination with other chips having various shapes in a manner to achieve the most dense (compact) layout. As a result, reductions in the size and thickness of the acceleration sensor chip package can be achieved while improving the detection sensitivity of the acceleration sensor chip.

Because the stoppers are the protruding elements and it is possible to increase the surface area and/or the number of stoppers, excessive displacement of the mobile structure can be suppressed and malfunctioning of the acceleration sensor chip can be prevented.

BRIEF DESCRIPTION OF THE DRAWINGS

FIG. 2A is a cross-sectional view taken along the dot-dash line 2A—2A in FIG. 1;

FIG. 2B is a cross-sectional view taken along the dot-dash line 2B—2B in FIG. 1;

DETAILED DESCRIPTION OF THE INVENTION

Figure 1:
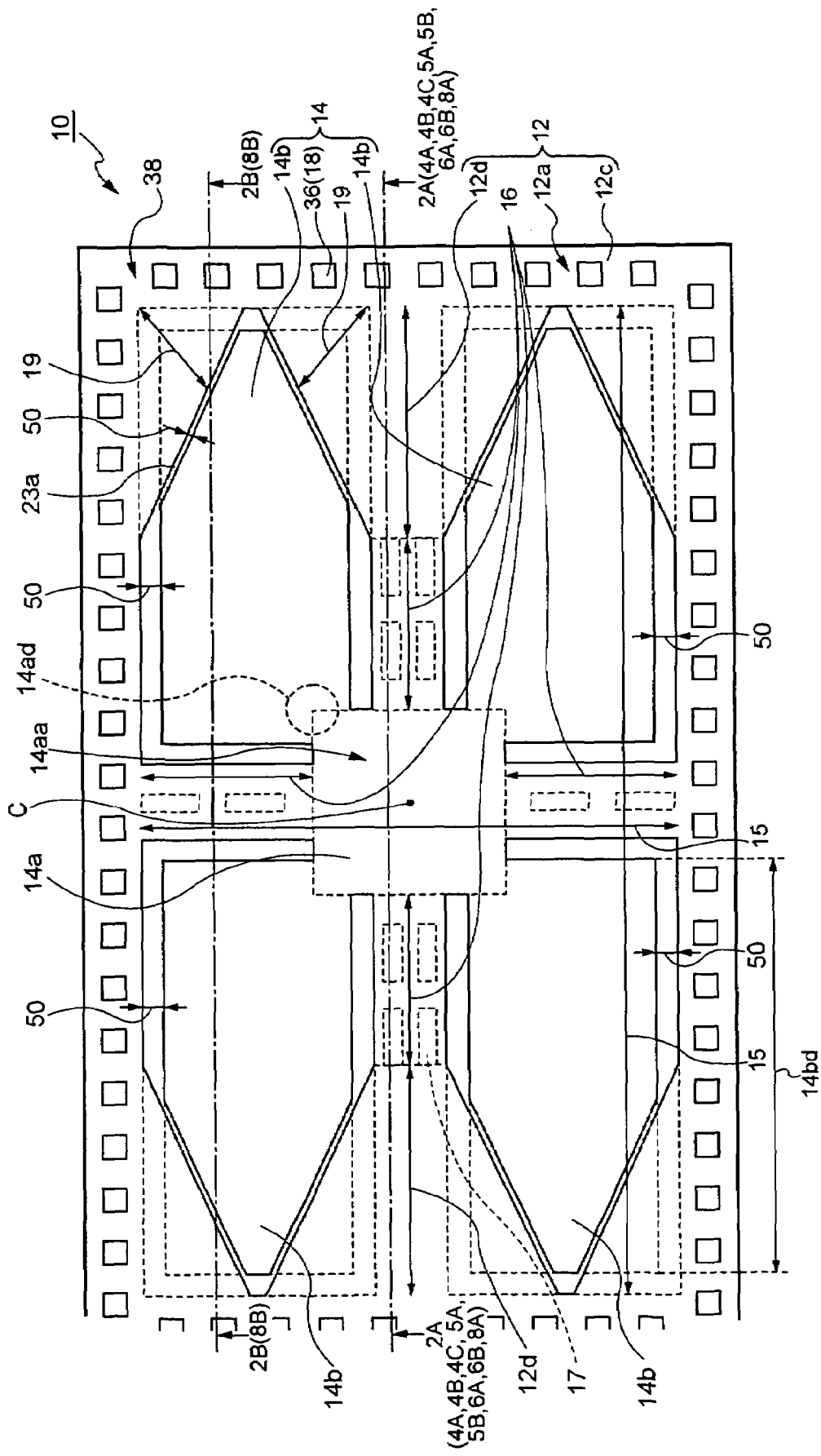
FIG. 1 is a schematic plan view illustrating components of an acceleration sensor chip according to one embodiment of the present invention.

An embodiment of this invention will now be described with reference to the drawings. It should be noted that the form, size, and arrangement of the various constitutional components in the accompanying drawings are merely illustrated in outline to an extent which allows comprehension of this invention. Accordingly, this invention is not limited to the illustrated examples.

In the following description, specific materials, conditions, numerical values, and so on are used, but these are merely preferred examples, and this invention is not limited to these preferred examples.

In the drawings, similar constitutional components have been allocated identical reference numerals, and duplicate description thereof has occasionally been omitted.

First, referring to FIGS. 1 to 3, a constitutional example of an acceleration sensor chip of this invention will be described. In the following description, a piezo-type three-axis semiconductor acceleration sensor chip having a bridge circuit is used as an example. The bridge circuit includes piezo elements.

Figure 3:
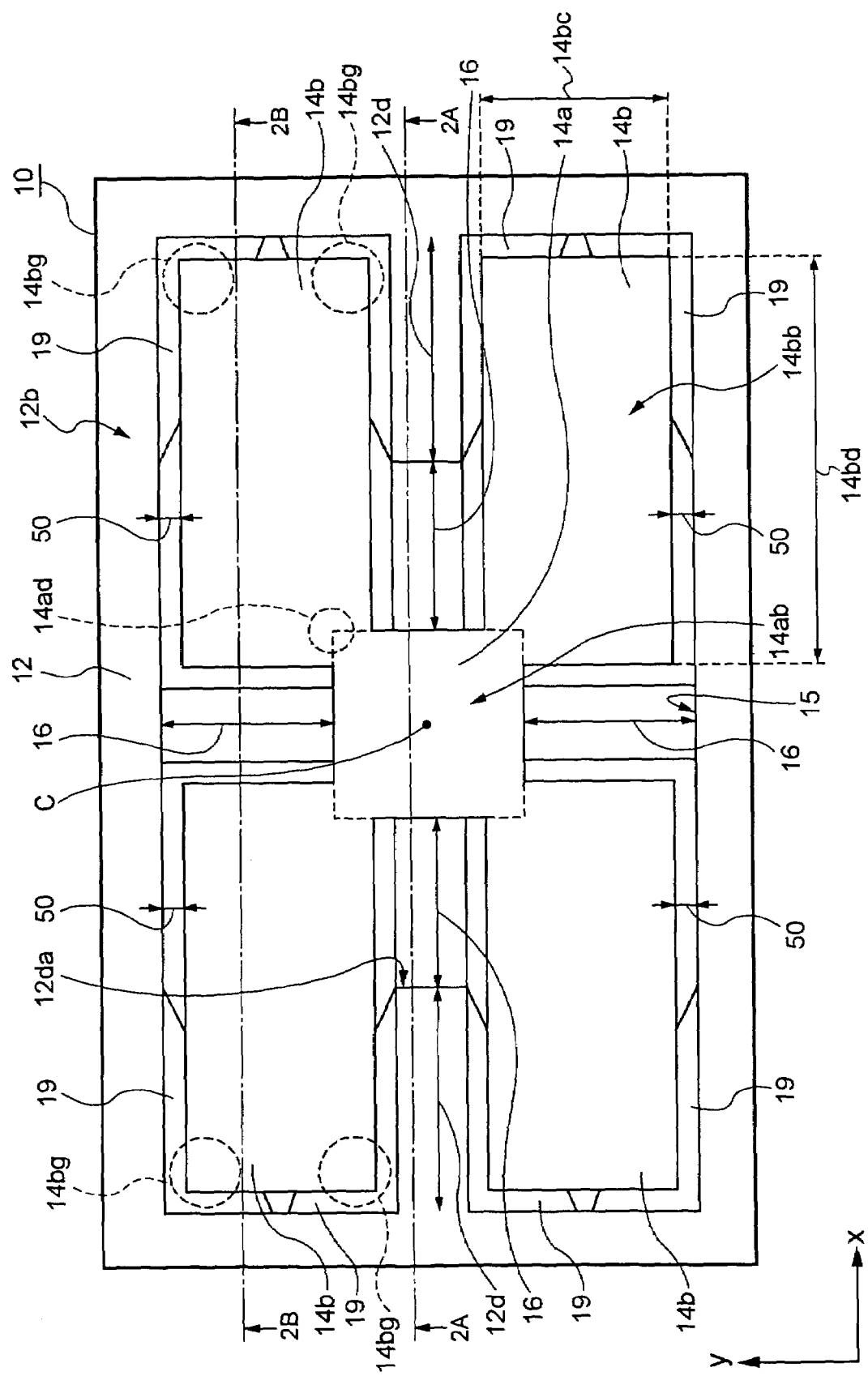
FIG. 3 is a schematic bottom view of the acceleration sensor chip shown in FIG. 1.

FIG. 1 shows an upper surface of the acceleration sensor chip and FIG. 3 shows a lower surface of the acceleration sensor chip seen.

As shown in FIGS. 1 and 3, an acceleration sensor chip 10 has a generally rectangular planar form, and is built in a semiconductor substrate having a flat plate form. An upper surface of the substrate is parallel to a lower surface of the substrate. Preferably, an SOI substrate (to be described in detail below) is used as the semiconductor substrate.

The acceleration sensor chip 10 has a frame portion 12. The frame portion 12 has a rectangular frame 12c defining the outer shape of the acceleration sensor chip 10, and two protruding portions 12d. The frame 12c will also be referred to as a frame body portion. The short sides and long sides of the frame body portion 12c are rectangular parallelepipeds with the same width and same thickness.

In FIGS. 1 and 3, the thickness of the frame portion 12, i.e., the thickness from a frame upper surface 12a to a frame lower surface 12b is a first thickness D1, and the upper surface 12a and lower surface 12b are parallel to each other. The long sides and short sides of the frame body portion 12c extend in an x axis direction and a y axis direction respectively, as shown in the drawing.

In FIGS. 1 to 3, the two protruding portions 12d are formed integrally with the frame portion 12. Each protruding portion takes the form of a rectangular parallelepiped. One of the protruding portions 12d is provided on one of the two short sides of the frame body portion 12c, and the other protruding portion 12d is provided on the other short side. The protruding portions 12d each extend from the center of their respective short sides toward the other short side in the x direction. The x direction is perpendicular to the short side of the frame body portion 12d. The width and protrusion length of the protruding portion 12d will be described later. The thickness thereof is the first thickness D1. The upper surface and lower surface of the protruding portion 12d are coplanar to the upper surface and lower surface of the frame body portion 12c, respectively.

The acceleration sensor chip 10 further has a plurality of beam portions 16. In FIGS. 1 to 3, the acceleration sensor chip 10 has four beam portions 16. These beam portions 16 extend on a cross line linking the centers of the opposing long and short sides of the rectangular frame 12. The upper surfaces of the beam portions 16 are coplanar to the frame upper surface 12a. The thickness of each beam portion 16 is set at a second thickness D2, which is thinner than the first thickness D1. Each beam portion 16 is generally an elongated, thin rectangular parallelepiped.

Two of the beam portions 16 integrally extend from the long sides of the frame body portion 12c. These two beam portions 16 extend in a perpendicular direction to the long sides of the frame 12, i.e., in the y direction, heading toward a center C of the frame 12.

The other two beam portions 16 protrude respectively from ends 12da of the protruding portions 12d. Thus, it can be said that these two beam portions are integral with the respective short sides of the rectangular frame body portion 12c. These two beam portions 16 extend in a perpendicular direction to their corresponding short sides of the frame 12, i.e., in the x direction, heading toward the center C of the frame 12. The four beam portions 16 are the parts which bend as a result of acceleration variation, and are therefore preferably formed in the same shape and from the same material. In other words, all the beam portions 16 are preferably identical in width, length, and thickness. It should be noted that the width, length, and thickness of the beam portions 16 may differ within a range that does not jeopardize the object of this invention.

The ends of the opposing beam portions 16 are spaced from each other, and the distances between the two opposing ends in the x direction and y direction are equal. The distance between the opposing beam portions 16 may be set to an appropriate value in accordance with the design. Once this distance is decided, the length of the beam portions 16 extending from the long sides of the frame body portion 12c is decided, and hence the length of the protruding portions 12d extending from the short sides of the frame body portion 12c are also determined. In this embodiment, the width of the protruding portion 12d is identical to the width of the beam portion 16, but this invention is not limited thereto.

The acceleration sensor chip 10 has a mobile structure 14. The center of the mobile structure 14 coincides with the center C of the frame body portion 12c of the rectangular frame 12. The mobile structure 14 is supported by the four beam portions 16 so as to be able to move in two directions (up and down directions) as indicated by the unshaded double-head arrow A and B in FIG. 2A. More specifically, the mobile structure 14 is connected to the ends of the four beam portions 16 and thereby formed integrally with the beam portions 16 so as to hang down in an inside space of the frame portion 12. The inside space of the frame 12 is an opening portion (recessed portion) 15 of the frame 12. The opening portion 15 is a space which includes recesses and through holes formed in the semiconductor substrate when the semiconductor substrate is processed to form the frame portion 12, beam portions 16, and mobile structure 14.

The upper surface of the mobile structure 14 is coplanar to the upper surfaces of the frame portion 12 and beam portions 16. The mobile structure 14 has a central weight portion 14a, and four protruding weight portions 14b extending integrally from the central weight portion 14a.

The central weight portion 14a is a block body having a rectangular parallelepiped form. The upper surface and lower surface of the central weight portion 14a are square. The side length of the square is equal to the distance between the ends of the opposing beam portions 16. The thickness of the central weight portion 14a is a third thickness D3 which is between the first thickness D1 and second thickness D2. More specifically, as shown in FIG. 2A, the central weight portion 14a has a square first surface (upper surface) 14aa, and a second surface (lower surface) 14ab which is parallel with the first surface 14aa. The second surface 14ab has the same shape as the first surface 14aa. The respective sides of the square first and second surfaces 14aa and 14ab oppose each other in parallel.

The central weight portion 14a has four side faces 14ac. These faces 14ac are sandwiched between the first surface 14aa and second surface 14ab. Each two adjacent side faces 14ac are connected to each other at 90 degrees, thereby forming a corner portion 14ad.

The beam portions 16 are connected at right angles to the central weight portion side faces 14ac. The beam portions 16 are coplanar to the first surface 14aa of the center weight portion 14a.

Each protruding weight portion 14b is a block body having a rectangular parallelepiped form. The protruding weight portion 14b has a first main surface 14ba having a short side 14bc and a long side 14bd, and a second main surface 14bb extending in parallel to the first main surface 14ba.

The protruding weight portion 14b has four rectangular side faces 14bf sandwiched between the substantially rectangular first main surface 14ba and second main surface 14bb.

Each protruding weight portion 14b is provided at each corner portion 14ad of the central weight portion 14a. The four protruding weight portions 14b are formed from the same material, in the same shape, and with equal dimensions. The short sides 14bc of the first main surface 14ba of each weight portion 14b extend in they direction, and the long sides 14bd extend in the x direction. Thus, the protruding weight portions 14b are formed integrally with the central weight portion 14a, and are spaced from the frame portion 12 (frame body portion 12c and protruding portions 12d) and the beam portions 16 by a gap 50 having a constant width. The protruding weight portions 14b are also spaced from stoppers 19 by the gap 50. A thickness D4 of the protruding weight portion 14b on the central weight portion 14a side is between the first and second thicknesses D1 and D2, and is preferably set to be equal to the third thickness D3.

The end portion of the protruding weight portion 14b on the frame body portion 12c side is formed thinner because the upper surface side of the protruding weight portion 14b is removed, and this end portion is set at a fifth thickness D5 which prevents contact with the associated stopper 19. The protruding weight portions 14b are supported by the central weight portion 14a, and are not in contact with the frame 12, beam portions 16 and stoppers 19. Each protruding weight portion 14b has a generally rectangular parallelepiped form which is elongated in the x direction.

The peripheral side surfaces of each protruding weight portion 14b are parallel to the opposing wall surfaces of the frame portion 12 and the beam portions 16. Thus the four protruding weight portions 14b are accommodated within the frame body portion 12c in two rows and two columns. The rows are partitioned by a linear array of the protruding portions 12d, beam portions 16, and central weight portion 14b, and the columns are partitioned by a linear array of the beam portions 16 and central weight portion 14b. The cavity 50 is a part of the opening portion 15 and penetrates the acceleration sensor chip 10.

Excessive displacement of the protruding weight portion 14bs of the movable structure 14 in the y direction (i.e., the direction of the short side 14bc) is restricted by the frame body portion 12c and protruding portion 12d. In particular, the shock resistance of the acceleration sensor chip 10 is improved by the protruding portions 12d.

The upper surfaces of the frame portion 12d, beam portions 16, and mobile structure 14 are coplanar to each other, and the frame 12, beam portions 16 and mobile structure 14 are all connected integrally.

The four beam portions 16 have the equal length so that the sensitivity of the acceleration sensor chip 10 can be made substantially uniform in the x, y and z directions, even if another rectangular parallelepiped frame 12 having different sizes in the x and y directions is used and another protruding weight portions 14b having different sizes in the x and y directions is used.

The acceleration sensor chip 10 has the stoppers 19. The stoppers 19 are thin plates for suppressing excessive displacement in the A direction of the double-headed arrow in FIG. 2A. The A direction is perpendicular to the upper surface of the mobile structure 14.

The stoppers 19 protrude horizontally from the frame body portion 12c into the inside space of the frame body portion 12c in eave form. Each stopper 19 extends over apart of the corresponding protruding weight portion 14b, but does not contact the protruding weight portion 14b. In other words, the stopper 19 is coplanar to the upper surface 12a of the frame portion 12 and faces the protruding weight portion 14b. Note that the area of the protruding weight portion 14b which faces the stopper 19 will be referred to as a facing portion.

In this embodiment, two stoppers 19 extend over two corner portions 14bg of each protruding weight portion 14b on the frame portion 12 side. One of the stoppers 19 is provided at the corner portion formed by the short side and long side of the frame body portion 12c so as to jut out from the short side and long side in a triangular wing form. The other stopper 19 is provided at the corner portion formed by the short side of the frame body portion 12c and the protruding portion 12d so as to jut out in a triangular wing form. Hence, in accordance with the triangular form of the stopper 19, the upper surface side of the corner portion of the protruding weight portion 14b on the short side of the frame body portion 12c, i.e., the facing portion of the protruding weight portion 14b, is formed as a thin stepped portion 14be to prevent contact with the stopper 19.

Figure 9A:
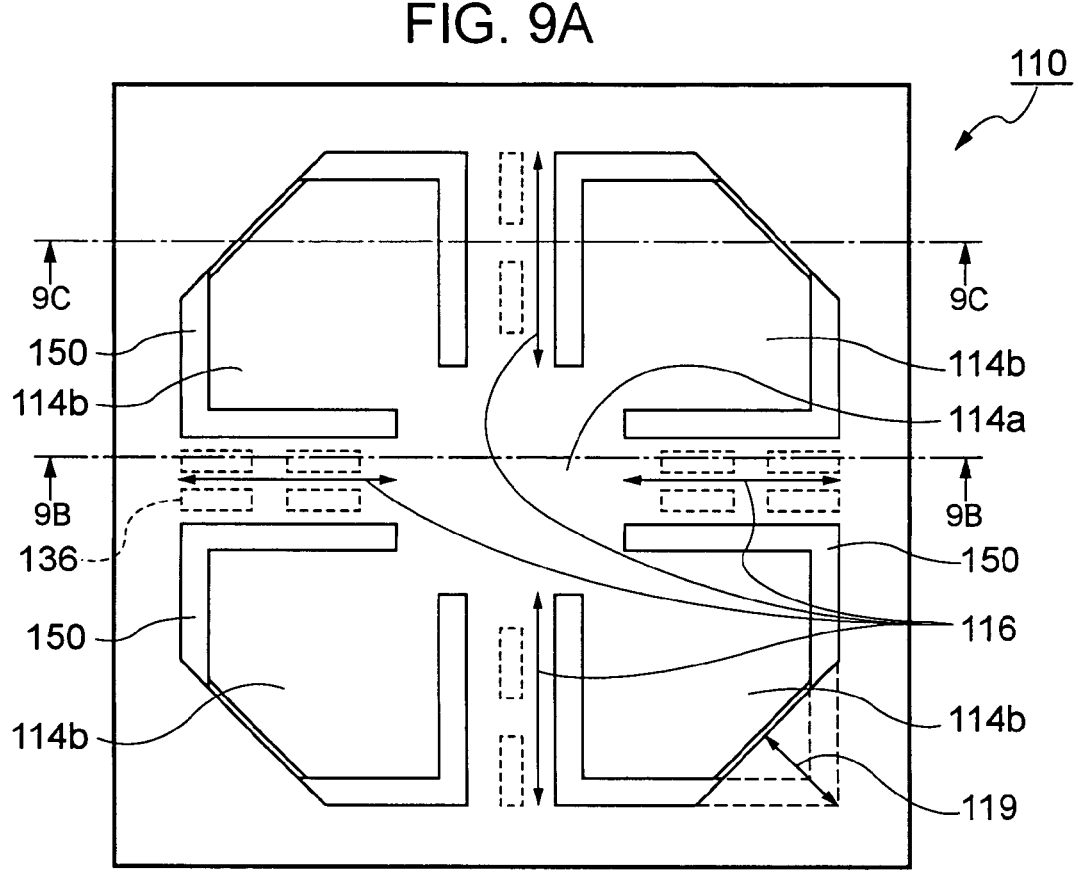
FIGS. 9A, 9B and 9C is a set of schematic views illustrating the prior art.
Figure 9B:
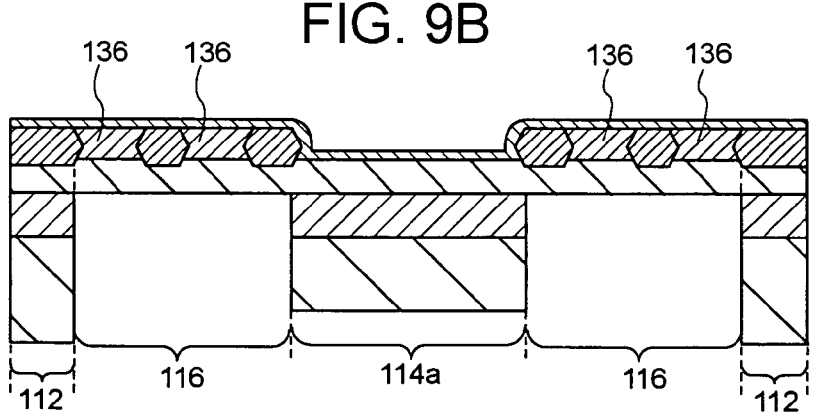
Figure 9C:
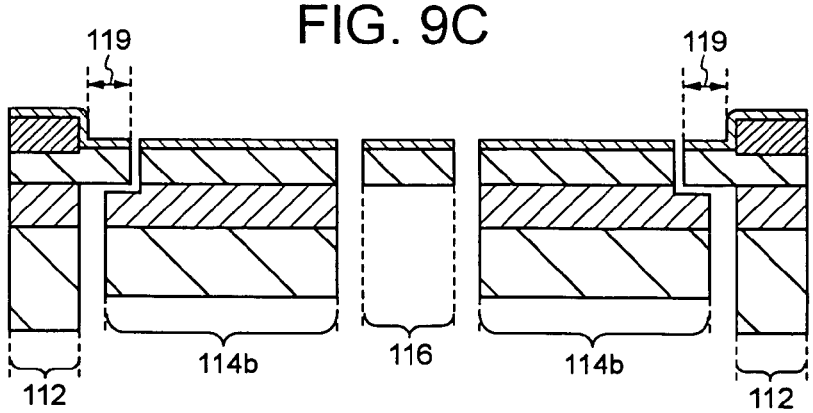

Thus two stoppers 19 exist over the two corner portions of each protruding weight portion 14b, and therefore excessive displacement of the protruding weight portion 14b is restricted by a larger number of stoppers 19 as compared to the conventional arrangement shown in FIG. 9A to FIG. 9C. Hence, undesirable displacement of the mobile structure 14 in the up and down directions (the A and B directions in FIG. 2A) can be restricted more reliably. As a result, the shock resistance of the acceleration sensor chip 10 is improved. More specifically, even when a shock (acceleration) which greatly exceeds the detection limit of the acceleration sensor chip 10 is applied to the acceleration sensor chip, the stress applied to each protruding weight portion can be dispersed by the two stoppers, and therefore failure of the acceleration sensor chip 10 can be prevented more reliably.

The shape of the stopper 19 is not limited to the illustrated example. For instance, two stoppers 19 for each protruding weight portion 14b may be combined to a single stopper which has a rectangular shape extending over the two corner portions 14bg of the associated protruding weight portion 14b. This stopper extends from the long side of the frame body portion 12c to the protruding portion 12d, and is coplanar to the upper surface 12a of the frame body portion 12c. This stopper can cover a wider area of the first main surface 14ba of the protruding weight portion 14b, and hence breakage of the acceleration sensor chip due to excessive shock can be prevented even more reliably.

As described above, the facing portion of the protruding weight portion 14b which faces the stopper 19 is thinner than other part (non-facing part) of the protruding weight portion 14b. As shown by the broken-line circle in FIG. 3, this thin portion is formed in an area including the corner portion 14bg. The upper surface of this thin portion is lower than the upper surface of the thick portion (i.e., the first main surface 14ba), and therefore the stepped portion 14be is naturally formed between the thick portion and thin portion. When viewed from the top, the shape of the stepped portion 14be is preferably similar to, but slightly larger than, the stopper 19 in order to avoid contact between the protruding weight portion 14b and stopper 19 during acceleration measurement within a predetermined range. The height D5 and surface area of the stepped portion 14be may be set as desired, taking into account the shape and size of the stopper 19 and on the condition that designed operations of the acceleration sensor chip 10 are not inhibited during acceleration measurement within the predetermined range.

An appropriate number of functional elements 17 are formed on each beam portion 16 for detecting acceleration as the bending in the beam portion 16. The functional elements 17 preferably include piezo elements. Further, each functional element 17 is preferably formed as a bridge circuit 36 constituted by the piezo elements and wiring 35. The piezo elements should be located in appropriate positions for measurement of the acceleration.

The piezo elements and associated elements will now be described more specifically with reference to FIG. 6B. Each piezo element 17 is connected to the wiring 35. A contact hole 34 passing through a thermal oxidation film 32 is filled with the wiring 35. The wiring 35 sends signals to the outside from the acceleration sensor chip. The wiring 35 is formed from a common material such as aluminum (Al), for example. A passivation film 38 is provided on the uppermost surface of the acceleration sensor chip 10.

An electrode pad 18, which is electrically connected to the piezo elements on each beam portion 16, is provided on each frame portion 12. In this embodiment, the electrode pad 18 is formed by making an opening in the passivation film 38. This opening exposes a part of the wire 35.

The piezo elements 17 on each beam portion 16 are isolated from each other by a LOCOS oxidation film 24.

Next, an operation of the acceleration sensor chip 10 will be described in brief.

When acceleration is applied to the acceleration sensor chip 10, the mobile structure 14 is displaced. More specifically, the beam portions 16 supporting the mobile structure 14 bend in accordance with the displacement of the mobile structure 14. The amount of this bending is measured as variation in the electric resistance value of the piezo elements 17 provided on the beam portions 16. The measured resistance value variation is sent to a detection circuit or the like provided outside the acceleration sensor chip 10 via the electrode pads 18, which are electrically connected to the bridge circuit having the piezo elements 17. Thus the acceleration applied to the acceleration sensor chip 10 is detected quantitatively.

Method of Manufacturing Acceleration Sensor Chip

Next, a method of manufacturing the acceleration sensor chip 10 of this invention will be described with reference to FIGS. 4A to 8C. Note that with the exception of the processes for forming the protruding portions and the stoppers 19, the manufacturing process for the acceleration sensor chip 10 is substantially identical to a manufacturing process for a conventional acceleration sensor chip (FIG. 9A to FIG. 9C), and therefore the manufacturing steps similar to the conventional method will be described briefly.

Figure 4A:
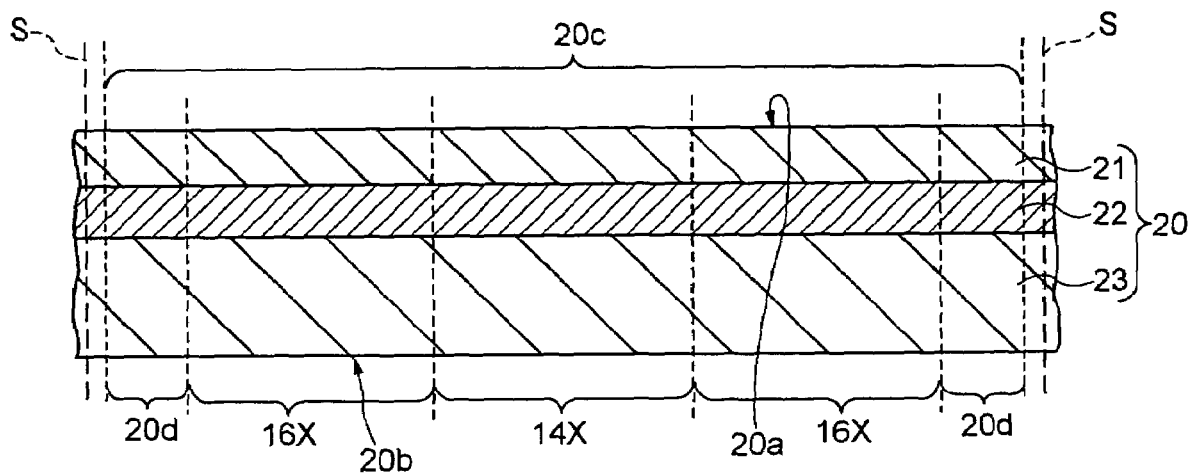
FIG. 4A is a cross-sectional view of the acceleration sensor chip during manufacture, taken along the dot-dash line 4A—4A in FIG. 1.
Figure 4B:
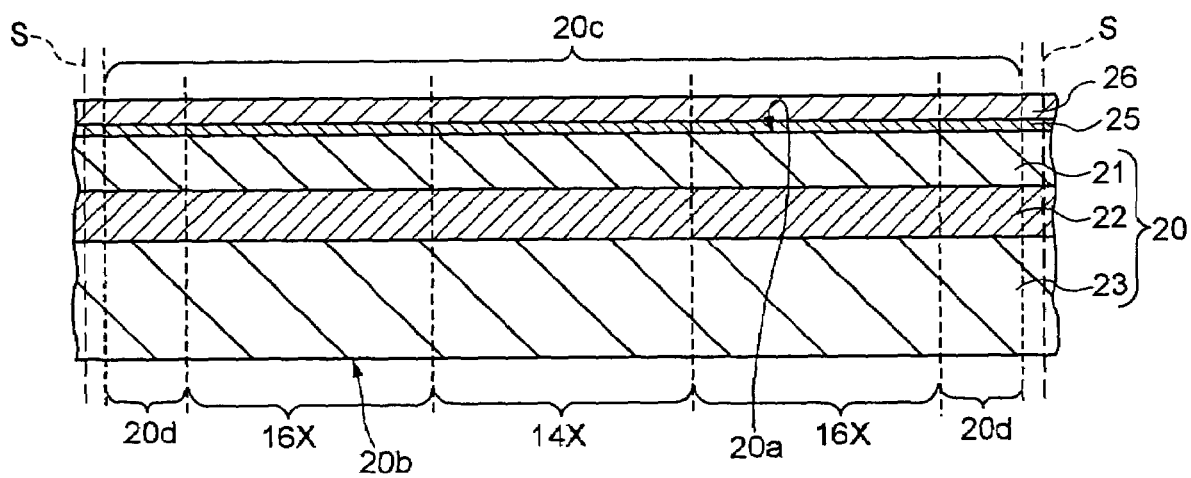
FIG. 4B is a cross-sectional view after FIG. 4A, taken along the dot-dash line 4B—4B in FIG. 1.
Figure 4C:
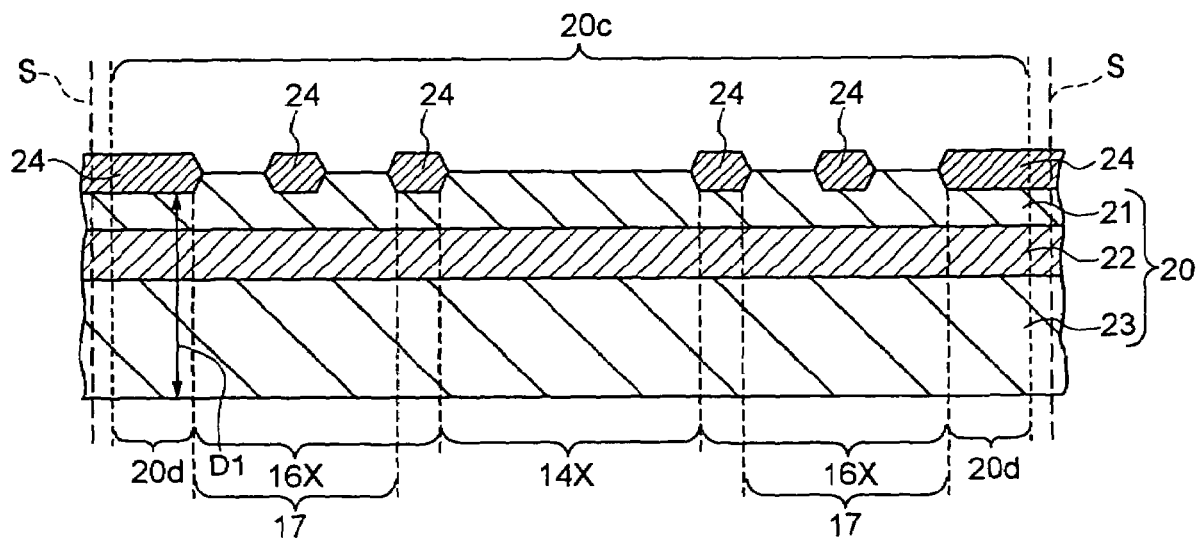
FIG. 4C is a cross-sectional view after FIG. 4B, taken along the dot-dash line 4C—4C in FIG. 1.

FIGS. 4A, 4B, and 4C are schematic cross-sectional views of the acceleration sensor chip during manufacture, taken along the dot-dash lines 4A—4A, 4B—4B, and 4C—4C in FIG. 1, which are the same line as the dot-dash line 2A—2A in FIG. 1.

Figure 5A:
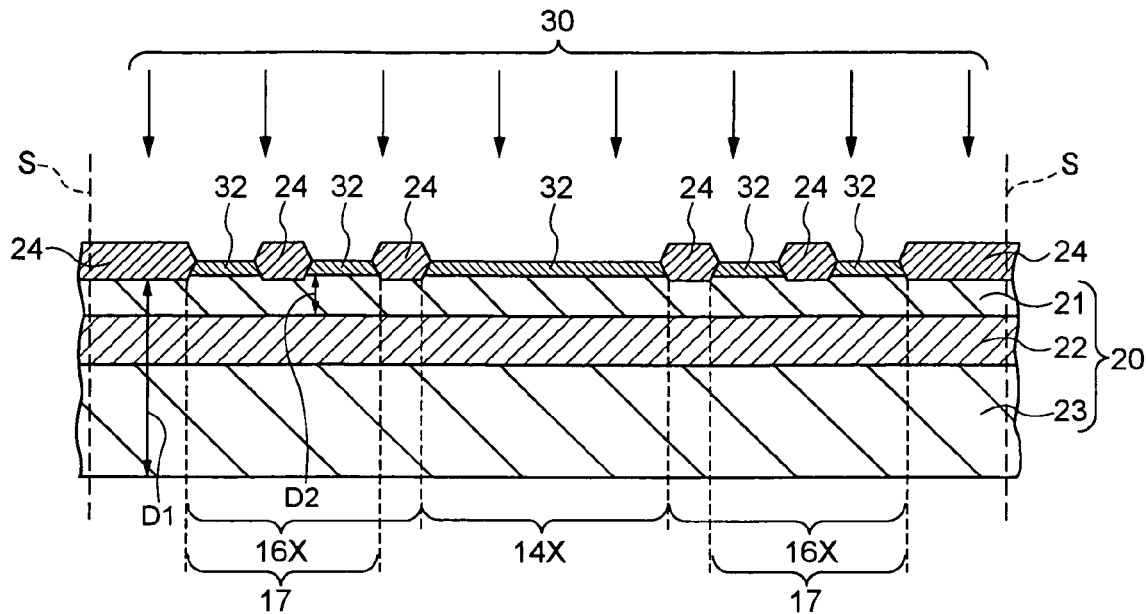
FIGS. 5A, 5B, and 5C are a series of cross-sectional views following FIG. 4C.
Figure 5B:
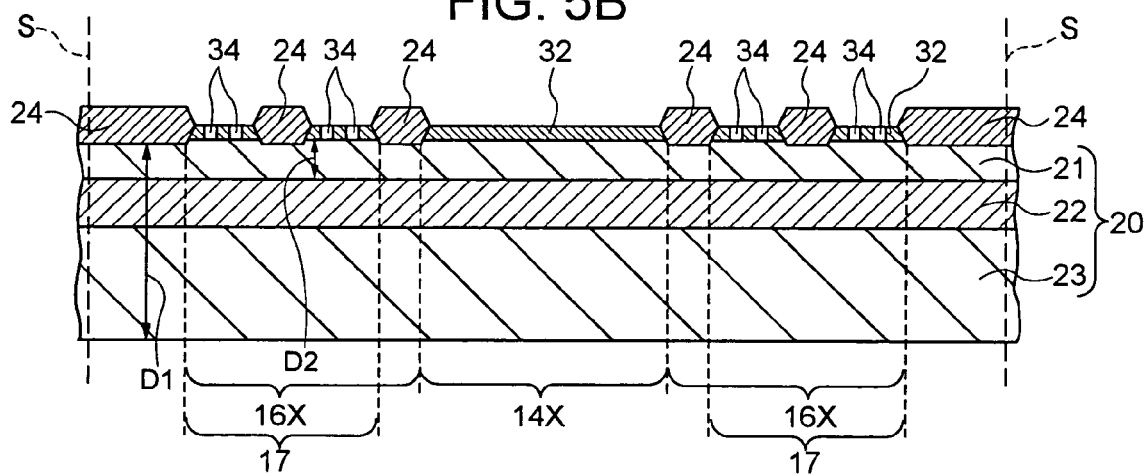
Figure 5C:
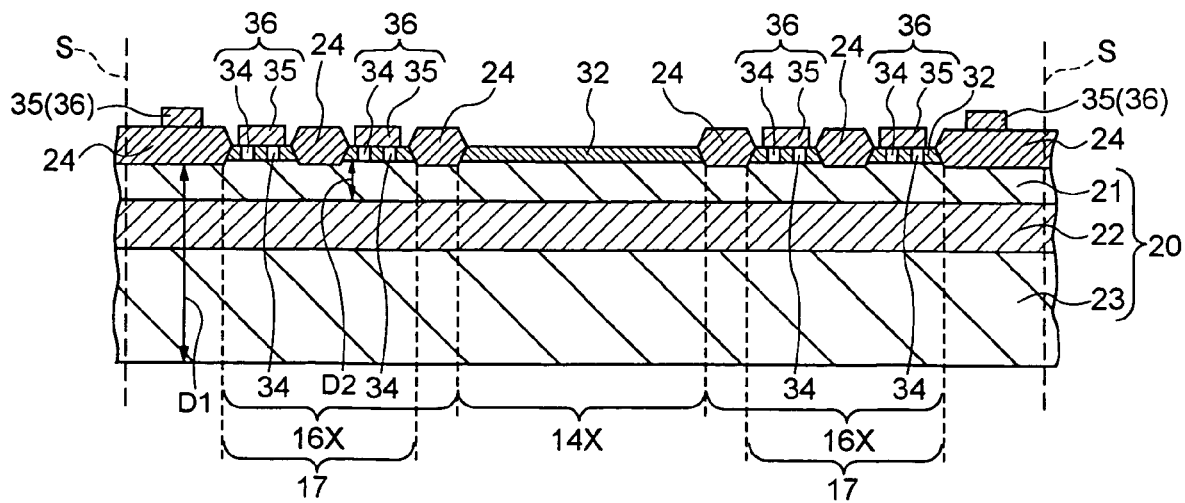

FIGS. 5A, 5B, and 5C are cross-sectional views following FIG. 4C.

Figure 6A:
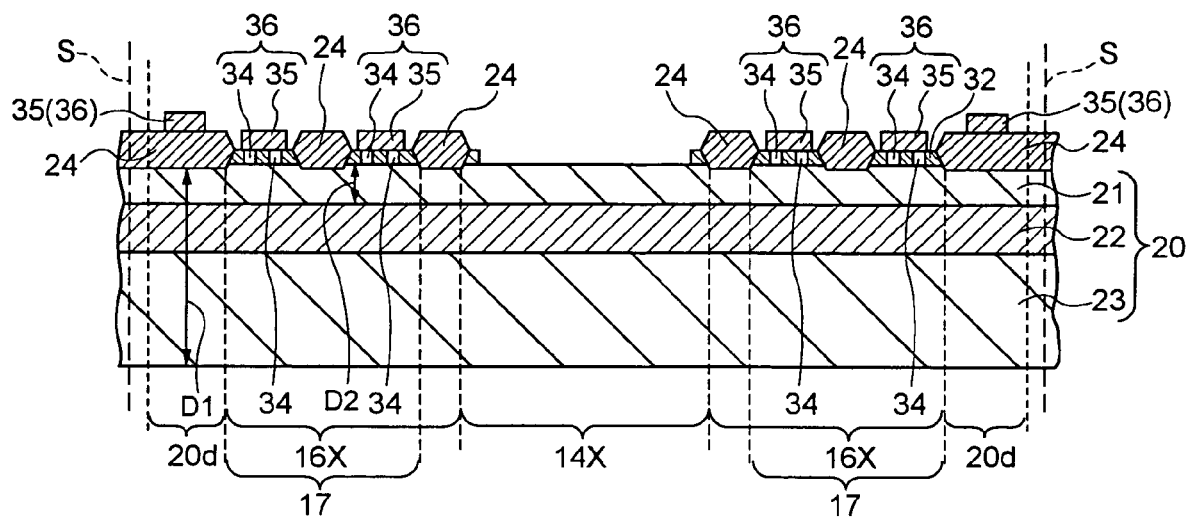
FIGS. 6A and 6B are cross-sectional diagrams following FIG. 5C.
Figure 6B:
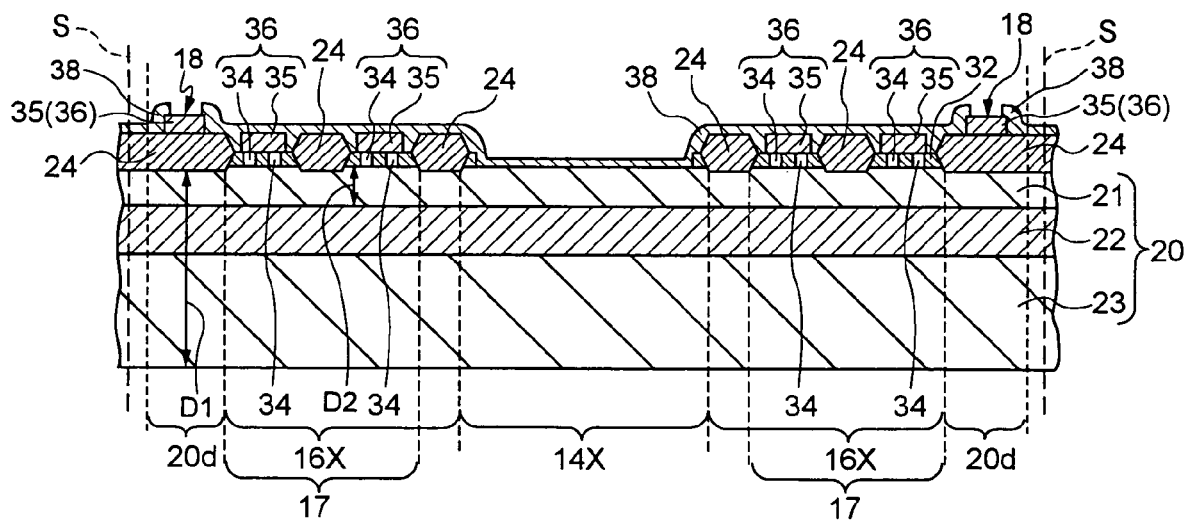

FIGS. 6A and 6B are cross-sectional views following FIG. 5C. FIG. 6A is a cross-sectional view taken along the line 6A—6A in FIG. 1, and FIG. 6B is a cross-sectional view taken along the line 6B—6B in FIG. 1. The lines 6A—6A and 6B—6B are the same line as the dot-dash line 2A—2A in FIG. 1.

Figure 7A:
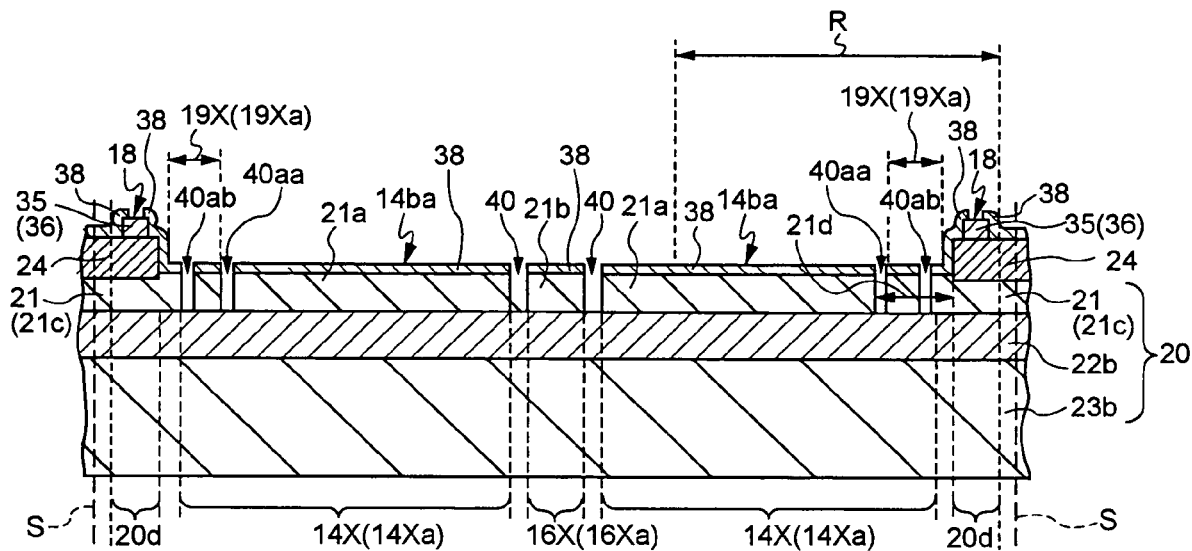
FIG. 7A depicts a cross-sectional diagram following FIG. 6B.
Figure 7B:
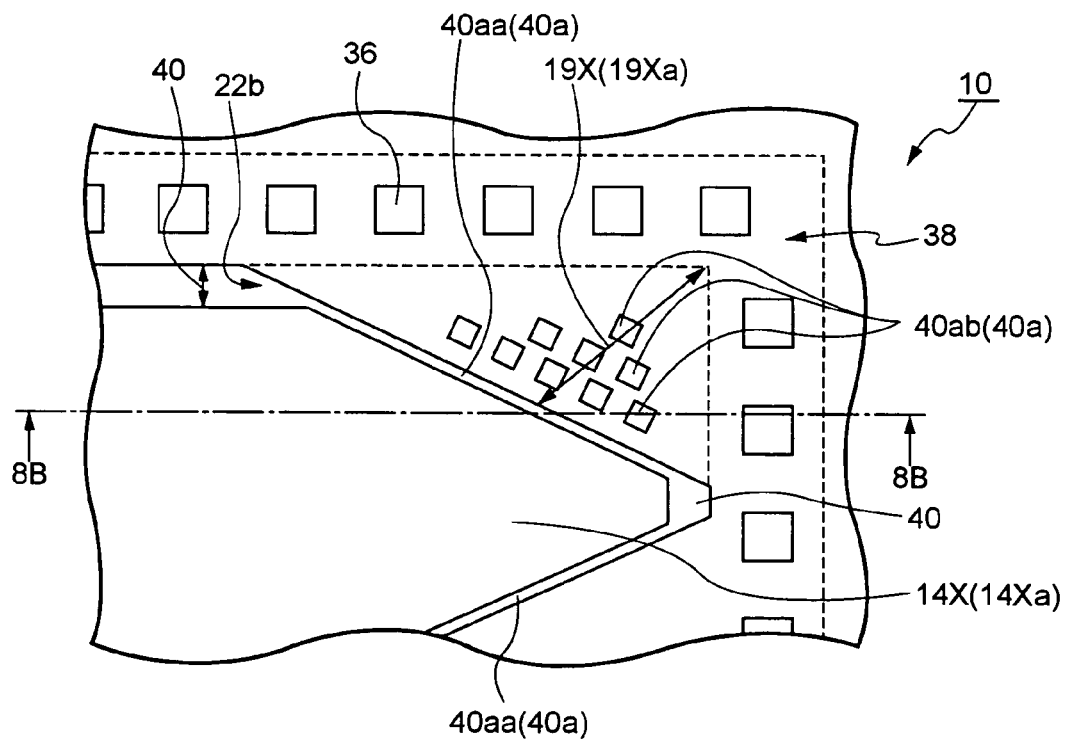
FIG. 7B depicts an enlarged plan view of an area R in FIG. 7A.

FIG. 7A is a cross-sectional view following FIG. 6B, and FIG. 7B is an enlarged plan view showing the main parts in an area R of FIG. 7A.

Figure 8A:
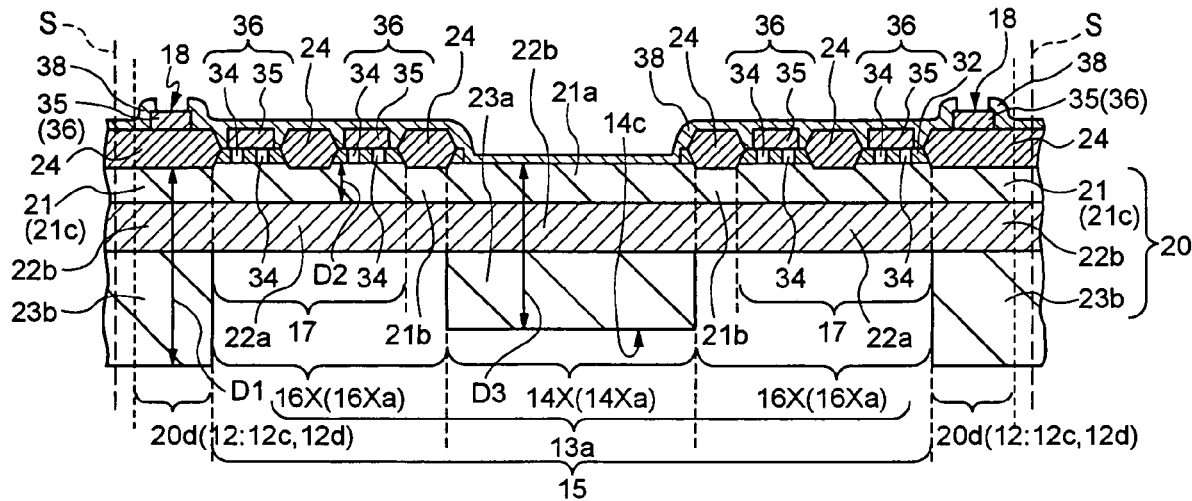
FIG. 8A illustrates a cross-sectional view following FIG. 7A, taken along the dot-dash line 8A—8A in FIG. 1.
Figure 8B:
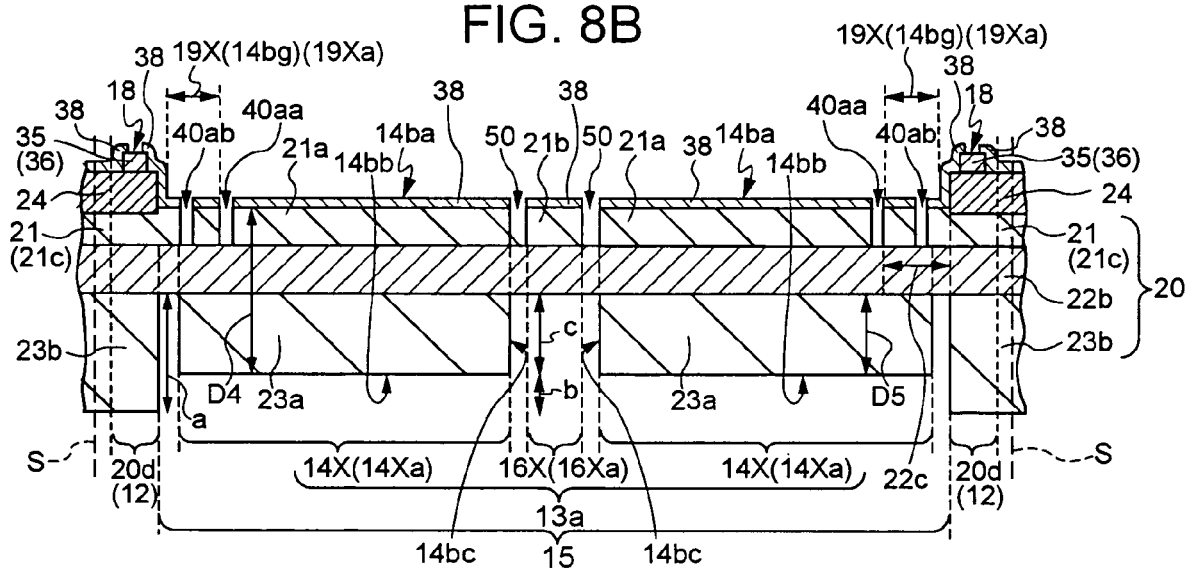
FIG. 8B illustrates a schematic cross-sectional view taken along the 8B—8B in FIG. 1.
Figure 8C:
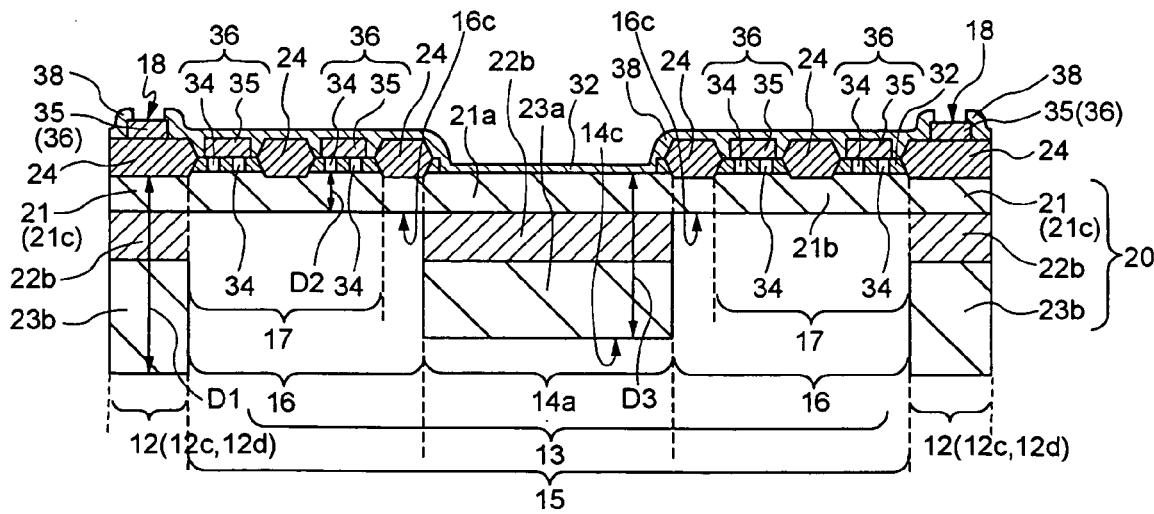
FIG. 8C illustrates a cross-sectional view after FIG. 8A and FIG. 8B.

FIGS. 8A, 8B, and 8C are cross-sectional views following FIG. 7A. Specifically, FIG. 8A is a schematic cross-sectional view taken along the dot-dash line 8A—8A which is the same line as the line 2A—2A in FIG. 1, and FIG. 8B is a schematic cross-sectional view taken at the same time as FIG. 8A along the line 8B—8B corresponding to the dot-dash line 2B—2B in FIG. 1.

First, as shown in FIG. 4A, a substrate 20 is prepared. The substrate 20 includes a first surface 20a, and a second surface 20b opposing the first surface 20a. The substrate 20 is preferably constituted by an SOI (Silicon On Insulator) wafer which is formed by laminating together a first silicon layer 21, a sacrificial layer (BOX layer) 22 which is a silicon oxide film, and a second silicon layer 23.

A plurality of chip areas 20c are defined by scribe lines S on the substrate 20 in advance. In the drawings and the following description, one chip area 20c is only illustrated and described as a representative of these chip areas 20c. The chip area 20c is the area that will become the acceleration sensor chip 10 when the substrate is individualized.

Next, an inner peripheral frame area 20d is set inside the chip area 20c on the substrate 20. The inner peripheral frame area 20d is an area which will become a frame portion 12 and define the contour of the acceleration sensor chip 10. The mobile structure 14 is not provided in the inner peripheral frame area 20d.

More specifically, the chip area 20c includes the frame (inner peripheral frame) area 20d in which the frame portion 12 will be formed, a mobile structure formation area 14X in which the mobile structure 14 will be formed, and beam portion formation areas 16X in which the beam portions 16 will be formed.

Next, the mobile structure 14, which exhibits the key function of the acceleration sensor chip, is formed. As described with reference to FIG. 1, the mobile structure 14 includes the central weight portion 14a and protruding weight portions 14b.

As shown in FIG. 4B, a pad oxidation film 25 and a silicon nitride film 26 are formed in accordance with normal methods on the first silicon layer 21 of the substrate 20, i.e., on the first surface 20a side.

Next, using a photolithography process, the pad oxidation film 25 and silicon nitride film 26 are patterned to form a predetermined master pattern. This master pattern will be used to form a LOCOS (Local Oxidation of Silicon) oxidation film.

Next, as shown in FIG. 4C, the LOCOS oxidation film 24 is formed by a common method. The LOCOS oxidation film 24 will isolate the functional elements (piezo elements) 17 from each other.

Then, the pad oxidation film 25 and silicon nitride film 26 used as the master pattern are removed. At this point, the thickness of the substrate 20 is D1.

Subsequently, piezo elements are formed in accordance with normal methods. First, as shown in FIG. 5A, for example, ion implantation is performed on the substrate 20 using the LOCOS oxidation film 24 as a mask. An ordinary ion implantation apparatus may be used in the ion implantation process. In accordance with normal methods, ions 30 such as boron (B), serving as a P-type impurity, are implanted in the exposed areas not covered with the LOCOS oxidation film 24.

Next, in accordance with normal methods, the implanted ions are subjected to a thermal diffusion process to diffuse the implanted ions to the areas under the LOCOS oxidation film 24.

By means of this thermal diffusion process, a thermal oxidation film 32 is formed in the exposed areas not covered with the LOCOS oxidation film 24 on the substrate 20 (FIG. 5A).

Thus, using normal methods, the piezo elements 17 are formed in predetermined positions on the substrate 20, i.e., the beam portion formation areas 16X.

Next, as shown in FIG. 5B, the contact holes 34, which penetrate the thermal oxidation film 32 to be electrically connected to the diffusion layer (piezo elements), are formed by the photolithography and etching processes.

Then, as shown in FIG. 5C, the wire 35 which fills the contact hole 34 is formed on the LOCOS oxidation film 24 and thermal oxidation film 32 using a well-known formation process.

As a result of this process, the piezo elements 17 and wire 35 are electrically connected, thus forming the bridge circuit 36 having the piezo elements. At this time, a part of the wire 35 is extended to an arbitrary position on the chip, for example onto the frame portion 12.

Next, as shown in FIG. 6A, the exposed area of the thermal oxidation film 32 (the planned formation areas 14X and 16X of the mobile structure 14 and beam portion 16, to be described below) is removed using normal methods.

As shown in FIG. 6B, the passivation film 38, which is constituted by a silicon nitride film ($Si_3N_4$), for example, is formed on the substrate 20.

The passivation film 38 is patterned by the photolithography and etching processes. During this patterning process, a part of the wire 35 (bridge circuit 36) connected to the piezo elements may be exposed from the passivation film 38 provided on the frame portion 12 to form the electrode pad 18.

Next, as shown in FIG. 7A, a precursory mobile structure 14Xa, precursory beam portions 16Xa, and precursory stoppers 19Xa (referred to simply as a precursory structure hereafter) are formed as the incomplete mobile structure 14, beam portions 16, and stoppers 19 (see FIG. 1). The precursory structure is fixed by the sacrificial layer 22. The precursory structure is obtained by partially etching the first and second silicon layers 21 and 23 on the first surface 20a side and second surface 20b side of the substrate 20 using the sacrificial layer 22 as an etching stopper layer such that the gap 50 and the recessed portion 15 are formed.

To this end, first, a master pattern (not shown) is formed from thick film resist using a photolithography process (e.g., a contact exposure process or projection exposure process) in order to form the gap 50.

This master pattern is used to open the areas inside the inner peripheral frame area 20d except for the mobile structure formation area 14X, beam portion formation areas 16X, and stopper formation areas 19X.

More specifically, the master pattern includes a linear pattern 40 which defines the mobile structure formation area 14X and stopper formation areas 19X, and a stopper formation opening portion 40a. This linear pattern (linear opening) 40 separates the frame portion 12 from the mobile structure 14. The stopper formation opening portion 40a has a linear opening portion 40aa, which is continuous from the opening portion 40 for separating the mobile structure 14 from the stoppers 19, and a plurality of dot-form openings 40ab provided in the stopper formation area 19X (see FIG. 7B also).

The form, size, number, and positions of the dot-form openings 40ab of the stopper formation opening portion 40a are decided in accordance with the form of the stopper separation opening portion, or decided such that the mobile structure and stoppers are separated from each other and the functions of the stoppers are not inhibited.

Next, as shown in FIG. 7A, etching is performed by means of the so-called Bosh process, for example, in accordance with normal methods and using the master pattern as a mask. More specifically, the first silicon layer 21 is etched from the exposed surface of the first silicon layer 21 to the surface of the BOX layer 22, which serves as the sacrificial layer. This etching process employs an ICP (Inductively Coupled Plasma) system, for example, and involves a side wall protection process using $C_4F_8$ as a material, and etching using $SF_6$ as an etchant. The sidewall protection process and etching process are repeated appropriately such that deep etching is performed.

As a result of this etching process, as shown in FIG. 7B, the opening portion 40 and stopper formation opening portion 40a are formed through the first silicon layer 21 such that the BOX layer 22 is exposed. In the illustrated embodiment, the linear opening portion 40aa separating the stopper 19 from the protruding weight portion 14b and nine dot-form opening portions 40ab provided in each stopper formation area 19X are formed as the stopper formation opening portion 40a.

Etching is performed using the BOX layer 22 as an etching stopper layer. Accordingly, the BOX layer 22 is not removed by this process. In other words, at this point in time, the precursory mobile structure 14Xa, precursory beam portions 16Xa, and precursory stoppers 19Xa are connected by the BOX layer 22.

In other words, by forming the opening portion 40 and stopper formation opening portion 40a down to the BOX layer 22, a first silicon layer part 21a of the mobile structure formation area 14X, a first silicon layer part 21b of the beam portion formation area 16X, a first silicon layer part 21c of the frame portion 12, and a first silicon layer part 21d of the stopper 19 remain.

Next, as shown in FIGS. 8A and 8B, etching is performed on the second silicon layer 23.

More specifically, the substrate 20 is turned over such that the second surface 20b becomes the upper side, and a master pattern (not shown) is formed in a similar manner to that described above from thick film resist on the second surface 20b side of the substrate 20 using a photolithography technique. Next, a deep etching process is performed, using the Bosh method. This etching is performed on an area inside the inner peripheral frame area 20d, which is to be left as the frame portion 12.

At this time, etching of the beam portion formation area 16X is performed on the second silicon layer 23 down to the BOX layer 22, i.e., using the BOX layer 22 as an etching stopper layer. Also, only a part of the thickness of the second silicon layer 23 is etched in the mobile structure formation area 14X, thereby forming an exposed surface (bottom surface) 14c. The height a of the formed recessed portion 15 from the top surface of the frame portion 12 includes a first depth down to the surface of the BOX layer 22, and a second depth b down to the etched surface of the second silicon layer 23. The thickness of the mobile structure 14 is a thickness c obtained by subtracting the second depth b down to the etched surface of the second silicon layer 23 from the first depth a. The first depth a is greater than the second depth b. In other words, etching is performed such that the thickness D1 of the frame portion 12 becomes equal to the thickness of the substrate 20, the thickness of that part of the precursory mobile structure 14Xa that is to form the central weight portion 14a becomes equal to the thickness D3, and the thickness of that part of the precursory mobile structure 14Xa that is to form the protruding weight portions 14b becomes equal to the thickness D4.

When etching the second silicon layer part 23a of the mobile structure formation area 14X, the etching depth can have a certain range as long as the second silicon layer part 23a is thinner than the second silicon layer 23, and the mobile structure 14 is able to secure a predetermined movement width.

By means of this process, the recessed portion 15 having an irregular bottom surface is formed on the rear surface side of the semiconductor substrate 20, and thus the precursory structure is formed. Further, as shown in FIG. 8A, a precursory structure serving as the frame portion 12 constituted by the frame body portion 12c and protruding portions 12d is also formed by this process (see FIG. 2A also).

At this time, the first silicon layer 21 part of the beam portion formation area 16X is lined by the BOX layer 22 and thereby reinforced. The stopper formation area 19X, beam portion formation area 16X, mobile structure formation area 14X, and the structure to become the frame portion 12 are connected to each other by the BOX layer 22.

Next, the precursory structure (i.e., the precursory mobile structure 14Xa, the precursory beam portions 16Xa, and the precursory stoppers 19Xa) is processed to the complete mobile structure 14, the complete flexible beam portions 16, and the complete stoppers 19, respectively. For this purpose, a sacrificial layer part 22a protruding into the recessed portion 15 and another sacrificial layer part 22c positioned below the precursory stopper 19Xa must be removed from the sacrificial layer (BOX layer) 22.

More specifically, the sacrificial layer part 22a is removed from the second surface 20b side. As a result, a sacrificial layer part 22b remains between the first silicon layer 21 and a remaining second silicon layer part 23b.

In addition, etchant is supplied to the sacrificial layer part 22c positioned below the precursory stopper 19Xa through the stopper formation opening portion 40a provided in the first silicon layer part 21d from the first surface 20a side, and thus the sacrificial layer part 22c is removed.

As a result, the beam portions 16 are completed as thin plate-form bodies having the thickness D2, which are capable of bending to a degree enabling measurement of a predetermined acceleration.

The mobile structure 14 and stoppers 19 are separated from each other as independent structures. In other words, the BOX layer 22 directly beneath the dot-form opening portions 40ab is removed such that the step portion 14be having the thickness D5 is formed in each protruding weight portion 14b (see FIG. 2B). The stopper 19 is completed as an eave form body which covers the top of the step portion 14be (see FIG. 2B). At this point, the mobile structure 14 becomes mobile for the first time.

This process may be carried out in accordance with the material of the sacrificial layer 22. Note, however, that the process must not impair the functions exhibited by other constitutions such as the wiring and piezo elements.

In this embodiment, the sacrificial layer (BOX layer) 22 is a silicon oxide film, and is therefore subjected to a wet etching process using a mixed solution containing acetic acid ($CH_3COOH$)/ammonium fluoride ($NH_3F$)/ammonium hydrogen fluoride (NH₄F) (solution), for example, in an appropriate mixing ratio (compositional ratio) as an etchant.

Further, the sacrificial layer removal process is performed using a parallel plate type CVD apparatus, by introducing a predetermined gas into a low pressure (reduced pressure) chamber. Preferred examples of the gas that is introduced into the chamber include hydrogen fluoride (HF) and gaseous water ($H_2O$).

The preferred reaction conditions are, for example, that a gas flow velocity of hydrogen fluoride is 500 sccm and a gas flow velocity of water is 100 sccm. The reaction is preferably advanced at a pressure of 12 KPa, for example, and a temperature of 80° C., for example.

By removing a part of the sacrificial layer (BOX layer) 22 in the manner described above, the mobile structure 14, beam portions 16, and stoppers 19 are completed.

Finally, dicing is performed along the scribe lines S provided between adjacent chip areas 20c using a dicing apparatus to obtain individual chips 10. Therefore, a plurality of acceleration sensor chips 10 is created from the single substrate 20, as shown in FIG. 8C.

According to this manufacturing method, an acceleration sensor chip having the constitution described above can be manufactured easily and efficiently.

This application is based on a Japanese Patent Application No. 2005-57312 filed on Mar. 2, 2005 and the entire disclosure thereof is incorporated herein by reference.

What is claimed is:

1. An acceleration sensor chip comprising:
    a frame portion having a frame body portion with a rectangular upper surface, and two protruding portions extending respectively from a central portion of each short side of said rectangular upper surface toward an opposite short side;
    four beam portions including two beam portions extending respectively from a central portion of each long side of said frame body portion toward an opposite long side, and two other beam portions extending respectively from two ends of said two protruding portions; and
    a mobile structure supported movably inside said frame body portion by said four beam portions, including a single rectangular parallelepiped-form central weight portion and four rectangular parallelepiped-form protruding weight portions connected respectively to four corner portions of said central weight portion, and being spaced from said frame portion and said beam portions.

2. The acceleration sensor chip according to claim 1, wherein said four beam portions have an equal length.

3. The acceleration sensor chip according to claim 1, further comprising a plurality of stoppers extending respectively from said frame body portion above parts of said protruding weight portions.

4. The acceleration sensor chip according to claim 3, wherein said stoppers include four triangular wing-form bodies provided at four corners of said frame body portion.

5. The acceleration sensor chip according to claim 4, wherein said stoppers include another four triangular wing-form bodies provided at four corners made by said short sides and said protruding portions.

6. The acceleration sensor chip according to claim 3, wherein said stoppers are four rectangular elements provided for said four protruding weight portions, respectively, each said rectangular element extending along said short side of said frame body portion from said long side of said frame body portion to said protruding portion.

7. The acceleration sensor chip according to claim 3, wherein said parts of said protruding weight portions are stepped portions which are thinner than other parts of said protruding weight portions, and an upper surface of said other parts of said protruding weight portions is coplanar with an upper surface of said stoppers.

8. The acceleration sensor chip according to claim 1, wherein said four beam portions have different lengths.

9. The acceleration sensor chip according to claim 1, wherein said beam portions are thinner than said frame body portion.

10. The acceleration sensor chip according to claim 1, wherein a thickness of said protruding portions is equal to a thickness of said frame body portion.

11. The acceleration sensor chip according to claim 1, wherein said four beam portions have different shapes.

12. The acceleration sensor chip according to claim 1, wherein a plurality of piezo elements are provided on said four beam portions.

13. An acceleration sensor chip, comprising:
    a frame portion having a rectangular frame defined by two opposing long sides, and two opposing short sides which are shorter than the long sides, said frame portion further having two protruding portions, each protruding portion extending from a central portion of a respective short side of said rectangular frame toward an opposite short side, each protruding portion having a thickness;
    four beam portions, including two beam portions each extending from a central portion of a respective long side of said rectangular frame toward an opposite long side, and two other beam portions each extending from an end of a respective protruding portion so as to be co-linear therewith, said beam portions having a thickness that is less than the thickness of said protruding portions; and
    a mobile structure movably supported inside said rectangular frame by said four beam portions, and including a single rectangular parallelepiped-form central weight portion, and four rectangular parallelepiped-form protruding weight portions connected respectively to four corner portions of said central weight portion and which are all spaced by a gap from said frame portion and said beam portions.

* * * * *